(12) United States Patent
Hayes et al.

(10) Patent No.: US 8,567,367 B2
(45) Date of Patent: Oct. 29, 2013

(54) CRANKSHAFT DAMPER AND TONE WHEEL ASSEMBLY HAVING NOISE REDUCING CONFIGURATION

(75) Inventors: Paul A. Hayes, Columbus, IN (US); Matt Reeves, Bloomington, IN (US); Dhanesh Purekar, Columbus, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 251 days.

(21) Appl. No.: 13/069,342

(22) Filed: Mar. 22, 2011

(65) Prior Publication Data

US 2011/0265755 A1    Nov. 3, 2011

Related U.S. Application Data

(60) Provisional application No. 61/316,131, filed on Mar. 22, 2010.

(51) Int. Cl.
*F02B 75/06* (2006.01)

(52) U.S. Cl.
USPC .................. 123/192.1; 29/278; 192/70.17

(58) Field of Classification Search
USPC .......... 123/192.1; 29/278; 464/68; 192/70.17
See application file for complete search history.

(56) References Cited

U.S. PATENT DOCUMENTS

| 4,543,924 | A | 10/1985 | Bostock et al. |
| 5,195,479 | A | 3/1993 | Hasetoh et al. |
| 5,235,227 | A | 8/1993 | Fazekas |
| 5,376,850 | A | 12/1994 | Elsing et al. |
| 5,558,066 | A | 9/1996 | Zhao |
| 5,640,935 | A | 6/1997 | Ishihara |
| 5,847,476 | A | 12/1998 | Elsing et al. |
| 6,131,547 | A * | 10/2000 | Weber et al. ............. 123/406.58 |
| 6,161,512 | A | 12/2000 | Beels Van Heemstede |
| 6,205,979 | B1 | 3/2001 | Sims, Jr. et al. |
| 6,216,327 | B1 * | 4/2001 | Hendrian ........................ 29/278 |
| 7,047,914 | B2 | 5/2006 | Komorowski |
| 2004/0061493 | A1 * | 4/2004 | Fishburn et al. ............... 324/173 |
| 2008/0110716 | A1 * | 5/2008 | Gelazin et al. ............. 192/70.17 |

\* cited by examiner

*Primary Examiner* — Marguerite McMahon
*Assistant Examiner* — James Kim
(74) *Attorney, Agent, or Firm* — Studebaker & Brackett PC

(57) ABSTRACT

This disclosure provides crankshaft damper and tone wheel assembly having a low noise characteristic. The crankshaft damper and tone wheel assembly can provides both damping of vibrations excited in a crankshaft of an internal combustion engine and an indication of the rotational speed or position of the crankshaft. The crankshaft damper including a hub portion and a ring-shaped portion connected to the hub portion by plural spokes, and the ring-shaped portion has an inner circumference that surrounds an area including the hub portion and the plural spokes. The tone wheel includes an annular-shaped portion connected to the crankshaft damper and having an inner diameter, an outer diameter, plural teeth arranged at an equal pitch along the outer diameter, and a same rotational axis as the crankshaft damper. To reduce transmitting noise of vibrations excited in the crankshaft, the annular-shaped portion does not overlap a substantial amount of the area defined by the inner circumference of the ring-shaped portion when viewed along a direction of the rotational axis.

12 Claims, 7 Drawing Sheets

CRANKSHAFT DAMPER AND TONE WHEEL ASSEMBLY HAVING NOISE REDUCING CONFIGURATION

RELATED APPLICATIONS

This application claims benefit of priority to Provisional Patent Application No. 61/316,131, filed on Mar. 22, 2010, the entire contents of which are hereby incorporated by reference.

FIELD OF THE INVENTION

The inventions relate to a crankshaft damper and tone wheel assembly, and to an internal combustion engine including a crankshaft damper and tone wheel assembly, and more particularly, to such assemblies having low noise output.

BACKGROUND

FIGS. 1A and 1B are rear and front view diagrams of a conventional crankshaft damper/tone wheel assembly 10. As used herein, "rear view" means a view along a direction of a rotating axis of a crankshaft damper/tone wheel assembly as seen from a side of the assembly that would face an internal combustion engine (not shown) when attached thereto, and "front view" means a view along a direction of the rotating axis of the assembly as seen from a side of the assembly that would face away from an internal combustion engine when attached thereto.

As shown in FIGS. 1A and 1B, a crankshaft damper/tone wheel assembly 10 includes a tone wheel generally shown at 12. The tone wheel 12, also known as a signal wheel, is attached to a crankshaft damper 14, typically comprises a thin circular ferromagnetic plate having an inner opening through which a hub portion 15 of the crankshaft damper is provided. The tone wheel 12 has evenly spaced teeth 16 at its periphery and one or more teeth on a tone wheel are omitted to form an area 18 that permits sensing of angular position of the rotating body relative to a reference point. The tone wheel 12 includes a first surface 12a and a second surface 12b that is raised relative to the first surface 12a. The second surface includes through holes for attaching the tone wheel 12 to the crankshaft damper 14 via fastening members 19. The crankshaft damper 14 is a rotating body attached to the engine crankshaft (not shown) via the hub portion 15. The tone wheel 12 rotates with the crankshaft damper 14 and crankshaft. A tone wheel such as tone wheel 12 can be provided on another type of rotating body, such as a wheel or axle component or other rotating body, along with a magnetic or optical pick up sensor to provide a signal indicating a an angular position of the rotating body or a speed at which the body is rotating.

Many internal combustion engines utilize a tone wheel at a position at a front end of a crankshaft either adjacent to, or attached to a crankshaft damper. Tone wheels used for this purpose typically include a cylindrical portion at the rear side of hub portion 15 (shown in FIG. 1A) that can include a keyway and/or other structure (not shown) for fastening the crankshaft damper/tone wheel assembly 10 to a crankshaft of an internal combustion engine. The hub portion 15 receives a crankshaft end portion and the crankshaft damper/tone wheel assembly 10 secured to a crankshaft.

The crankshaft damper 14 is designed to absorb and dissipate vibration of engine components due to their individual elastic deformations, which result of torsional and axial forces acting on the engine's crankshaft and camshaft from periodic combustion impulses. In FIG. 1B, which shows a front view of the crankshaft damper/tone wheel assembly 10, the damper hub portion 15 is surrounded by a ring-shaped inertial mass portion 20, which is attached to the hub portion 15 via plural spokes 22. A torsionally elastic material 28 is provided between the inertial mass portion 20 and an outer portion of the hub portion 15. However, alternative damping configurations can be used, such as viscous dampers that utilize shear flow from viscous liquid and a ring-shaped weight interacting in a space of a ring shaped housing. The tone wheel 12 is attached to the back of the crankshaft damper such that when the crankshaft damper is attached to a crankshaft, the tone wheel is coaxial with the crankshaft damper and is positioned between the crankshaft damper and the front of the engine. While not shown, the damper can include or have attached thereto one or more pulleys for driving one or auxiliary components (e.g., water pumps, power steering pumps, alternators etc.) using one more belts.

SUMMARY

The present disclosure describes a crankshaft damper and tone wheel assembly, and an internal combustion engine including a crankshaft damper and tone wheel assembly that can reduce the amount of noise from frequencies excited in a crankshaft and transmitted by the tone wheel of the assembly.

In one aspect of the disclosure, a crankshaft damper and tone wheel assembly for damping vibrations of a crankshaft of an internal combustion engine and indicating the rotational speed or position of the crankshaft includes a crankshaft damper connected to a tone wheel. The crankshaft damper includes a hub portion and a ring-shaped portion connected to the hub portion by plural spokes. The ring-shaped portion has an inner circumference surrounding an area including the hub portion and the plural spokes. The tone wheel is an annular-shaped and has an inner diameter, an outer diameter, plural teeth arranged at an equal pitch along the outer diameter, and a same rotational axis as the crankshaft damper. When viewed along a direction of the rotational axis, the annular-shaped tone wheel does not overlap a substantial amount of the area defined by the inner circumference of the ring-shaped portion.

In another aspect of the disclosure, an internal combustion engine includes a crankshaft connected to a plurality of piston rods and pistons and a crankshaft damper and tone wheel assembly connected to an end of the crankshaft. The crankshaft and the crankshaft damper and tone wheel assembly have a same rotational axis. The crankshaft damper and tone wheel assembly includes a crankshaft damper having a hub portion and a ring-shaped portion connected to the hub portion by plural spokes. The ring-shaped portion has an inner circumference surrounding an area including the hub portion and the plural spokes. An annular-shaped tone wheel is connected to the crankshaft damper and has an inner diameter, an outer diameter, and plural teeth arranged at an equal pitch along the outer diameter. When viewed along a direction of the rotational axis, the annular-shaped tone wheel does not overlap a substantial amount of the area defined by the inner circumference of the ring-shaped portion.

Other features, elements, characteristics and advantages will become more apparent from the following detailed description of exemplary embodiments with reference to the attached drawings.

DETAILED DESCRIPTION

The inventors have realized that torsional and axial forces acting on a crankshaft of an internal combustion engine from a plurality of piston rods and pistons connected to a crankshaft and performing periodic combustions to rotate the crankshaft can excite a broad spectrum of frequencies in the crankshaft and camshaft, which can be transmitted to an adjacently provided tone wheel. Tone wheel vibrations are excited by the transmitted vibrations, which cause the tone wheel to radiate noise into the atmosphere. The inventors found that a configuration of a crankshaft damper/tone wheel assembly such as shown FIGS. 1A and 1B includes a portion inside the an inner diameter of the inertial mass portion 20, most notably portion 12b, which exhibits a speaker effect that magnifies crankshaft excitations.

Figure 2A:
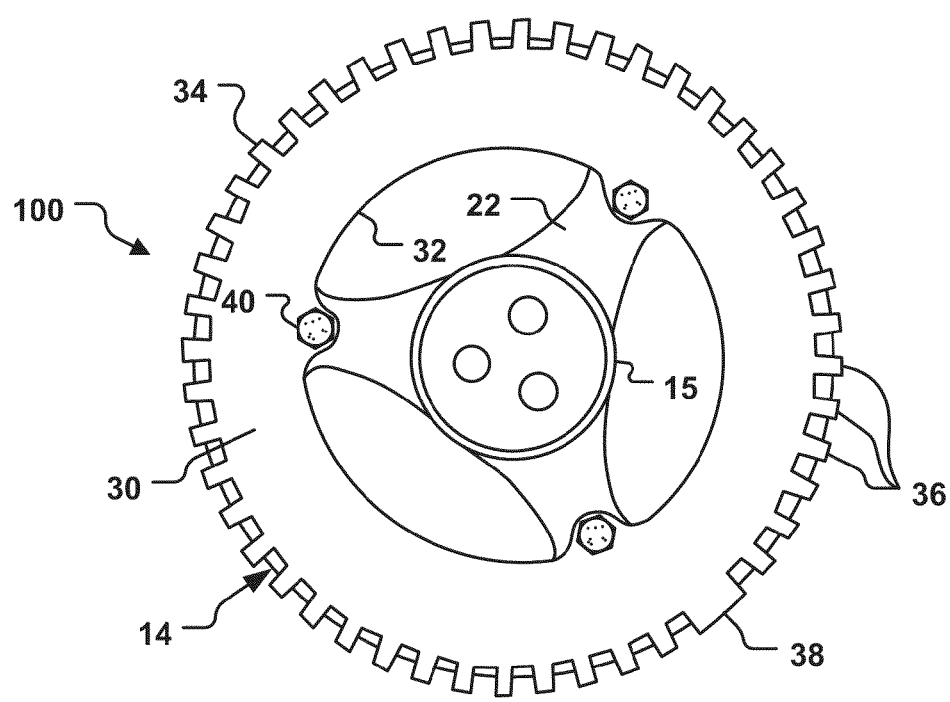
FIGS. 2A and 2B are respectively rear and front view diagrams of a crankshaft damper and tone wheel assembly including a unitary plate tone wheel according to an exemplary embodiment.
Figure 2B:
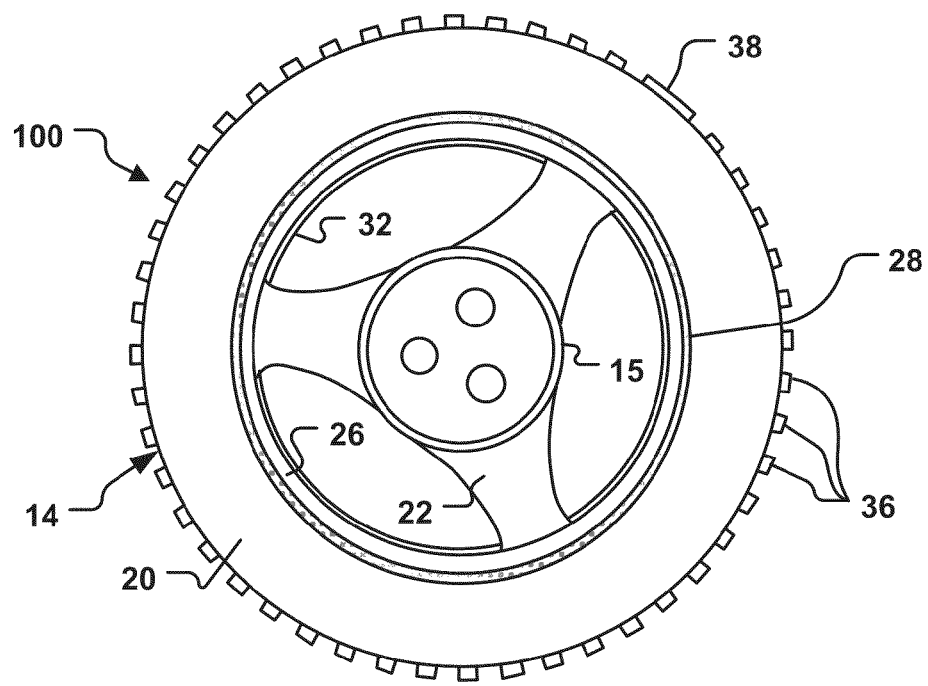

FIGS. 2a and 2b respectively show back and front views of a crankshaft damper/tone wheel assembly 100 according to an exemplary embodiment. The crankshaft damper/tone wheel assembly 100 includes a substantially annular-shaped unitary plate tone wheel 30 having an inner diameter 32 and an outer diameter 34. Plural teeth 36 are arranged at an equal pitch about the perimeter of the unitary plate tone wheel 30 at the outer diameter 34, and an area 38 that is elongated relative to a tooth is provided to permit sensing of an angular position of the rotating body relative to a reference point. The unitary plate tone wheel 30 is secured to the crankshaft damper by fasteners 40 (e.g., screws, bolts, rivets etc.) provided in holes extending through the unitary plate of the annular-shaped tone wheel 30 and secured to plural spokes 22, which number three in this exemplary embodiment. In this embodiment, the inner diameter 32 of the annular-shaped unitary plate tone wheel is substantially coincident or can be equal to the diameter across the inner surface of the ring-shaped inertial mass 20 of the crankshaft damper 14. In other embodiments, the inner diameter of the annular-shaped tone wheel is set such that the annular-shaped unitary plate tone wheel does not significantly overlap an area including the hub portion 15 and the plural spokes 22 surrounded by the inner circumference of the ring-shaped inertial mass 20. For example, a substantial amount of the area (e.g., 50% to 100%) within the inner circumference of the ring-shaped inertial mass 20 is not overlapped with the with the annular-shaped unitary plate tone wheel 30 when viewed along a direction of a rotational axis of the assembly 100 (i.e., a direction normal to the viewing surface of FIGS. 2A and 2B).

In an embodiment, the annular-shaped tone wheel 30 substantially overlaps at least a portion of a side surface of the annular band-shaped or ring-shaped inertial mass 20 of the crankshaft damper, but does not substantially overlap the area interior to the inner circumferential surface of the inertial mass 20 when viewed in a direction along the rotational axis. For example, overlapping of substantially an entire surface of the annular-shaped unitary plate tone wheel 30 such that it is essentially coincident with the ring-shaped inertial mass 20 along the rotational axis direction, as shown in FIGS. 2a and 2b, significantly reduces surface material of the tone wheel 30 that would cause noise radiating "speaker effects."

Figure 3:
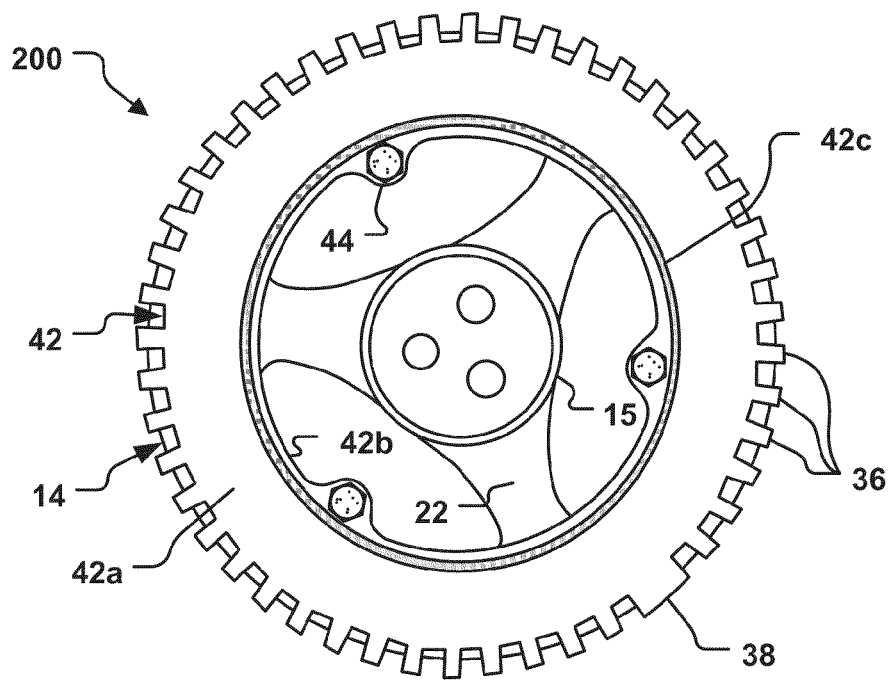
FIG. 3 is a rear view diagram of a crankshaft damper and tone wheel assembly including a multi-piece plate tone wheel according to an exemplary embodiment.

FIG. 3 shows a rear view of crankshaft damper/tone wheel assembly 200 according to another exemplary embodiment. Same numbered items in FIG. 3 as shown in FIGS. 1A, 1B, 2A and 2B are described above. The crankshaft damper/tone wheel assembly 200 comprises a tone wheel shown generally as 42, which includes an annular-shaped plate portion 42a including teeth 36 positioned along its outer periphery, an inner plate portion 42b, and an elastic coupling 42c provided between and attached to each of the annular-shaped plate portion 42a and the inner plate portion 42b. The inner plate portion 42b includes a configuration 44 for attaching the tone wheel 40 to a complementary configuration on the crankshaft damper 14, such as a protruding portion at 45 (e.g., a boss, not visible in FIG. 3) provided for each attaching configuration 44 on the ring-shaped inertial mass 20 of the crankshaft damper (only a periphery portion of the ring-shaped inertial mass 20 is shown in FIG. 3), although a configuration such as in FIG. 2A can be implemented to attach each attaching configuration 44 of the inner plate portion 42b to a respective spoke 22 of the crankshaft damper 14. The attaching configuration can include, for example, holes through which fasteners (e.g., screws, bolts, rivets etc.) can be provided to secure the inner plate 42b, and thus the entire tone wheel 42 to the crankshaft damper 14.

As shown in FIG. 3, the elastic coupling 42c is provided between the inner plate portion 42b and the annular-shaped portion 42a to dampen vibrations excited in the engine crankshaft and transmitted through the crankshaft damper 14 and the annular-shaped portion 42a to the annular shaped portion 42a of the tone wheel 42. The elastic coupling 42c can be a material such as an o-ring, which can be rubber or another elastic material. For example, the elastic coupling 42c can be provided in bound form (vulcanized or bonded) or glued, or any other suitable way to attach the first portion 42a and the second portion 42b and provide additional quenching or damping of one or more excitable frequencies of the tone wheel 42.

Figure 4:
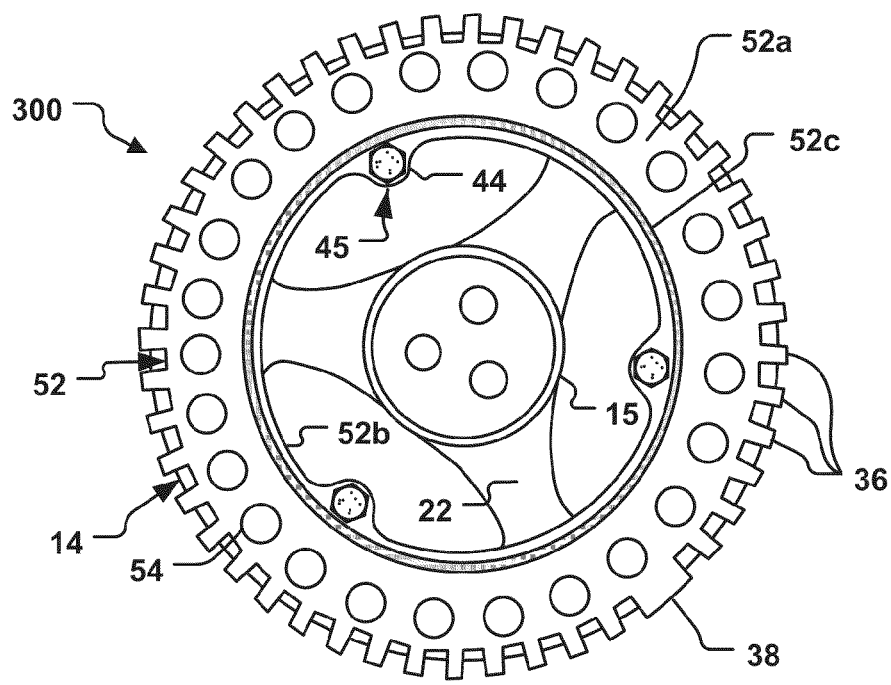
FIG. 4 is a rear view diagram of a crankshaft damper and tone wheel assembly including a multi-piece plate tone wheel having holes according to an exemplary embodiment.

FIG. 4 shows a rear view of crankshaft damper/tone wheel assembly 300 according to another embodiment. Same numbered items in FIG. 4 as shown in FIGS. 1A, 1B, 2A, 2B and 3 are described above. The crankshaft damper/tone wheel assembly 300 comprises a tone wheel 52 that includes an annular-shaped plate 52a including teeth 36 positioned along its outer periphery, and an inner plate portion 52b including a configuration 44 for attaching the tone wheel 52 to a complementary configuration on the crankshaft damper 14, such as described above with respect to FIG. 3, and an elastic coupling 52c provided between, and attached to each of the annular-shaped plate portion 52a and the inner plate portion 52b. To reduce the open surface area of the annular-shaped plate 52a capable of radiating noise, at least one opening 54 is provided in the annular shaped plate. The openings 54, as well as the inner diameter of the annular-shaped plate 52a, can be made large to reduce the stiffness of the annular plate of the tone wheel without significantly affecting the mass of the tone wheel 52. This will result in lower natural frequency and hence reduced radiation efficiency because radiation efficiency is directly proportional to the natural frequency. For example, openings 54 of about 14 to 24 mm diameter can be provided in the annular-shaped plate 52a without significantly affecting the mass of the tone wheel 52, with better results obtained for opening diameters around 24 mm. In a preferred embodiment, this can be achieved by creating at least one hole on the annular tone wheel such that the diameter of the hole is at least equal to or greater than about 10% of the diameter of the tone wheel. Engines using larger dampers/tone wheel configurations in accordance with the disclosure would have a correspondingly larger rubber damper and tone wheel, and thus also optimally sized holes.

Although the embodiment of FIG. 4 shows plural openings 54 provided in an o-ring type tone wheel configuration, openings can be provided in other embodiments that do not utilize an elastic portion joining inner and outer plate portions, such as shown above with respect to FIG. 2A. Also, the tone wheel 52 can be attached to the crankshaft damper 14 by way of fastening the tone wheel to the spokes 22 similar to the attaching configuration utilized in the embodiment shown in FIGS. 2A and 2B. Conversely, it is to be appreciated that the embodiment shown in FIGS. 2A and 2B can be implemented with an attaching configuration such as the attaching configuration 44 utilized in the embodiments of FIGS. 3 and 4, or provided in another position in the unitary annular-shaped plate 30.

In another "quieted" embodiment, damping material may be provided in any of the above-described assemblies at a position between a side of the annular-shaped tone wheel facing the ring-shaped inertial mass of the crankshaft damper. For example, an embodiment can comprise damping material provided at least at the positions of the fastening elements securing the tone wheel to the crankshaft damper. In an embodiment, damping material such as weather strip material or other acoustic damping material can be provided around a substantial amount of the area between the tone wheel and the inertial mass 20 of the damper 14. However, similar to the elastic material 46 described above, a damping material between a side surface of the annular-shaped tone wheel facing a side surface of the ring-shaped inertial mass can comprise an o-ring, such as a rubber or other elastic material or any other suitable material capable of providing additional damping characteristics to a damper/tone wheel assembly.

Figure 1A:
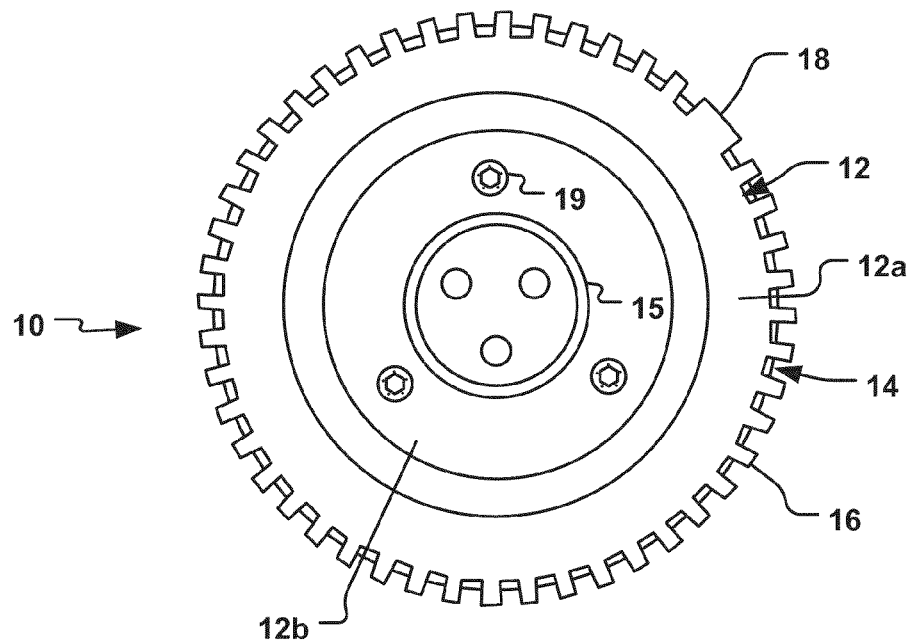
FIGS. 1A and 1B are respectively rear and front view diagrams of a conventional crankshaft damper and tone wheel assembly.
Figure 1B:
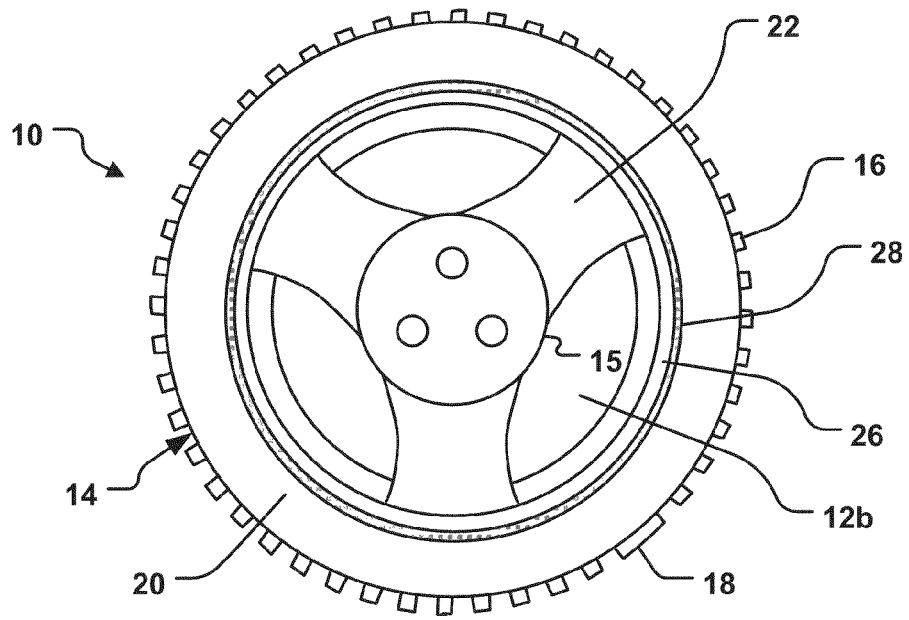
Figure 5:
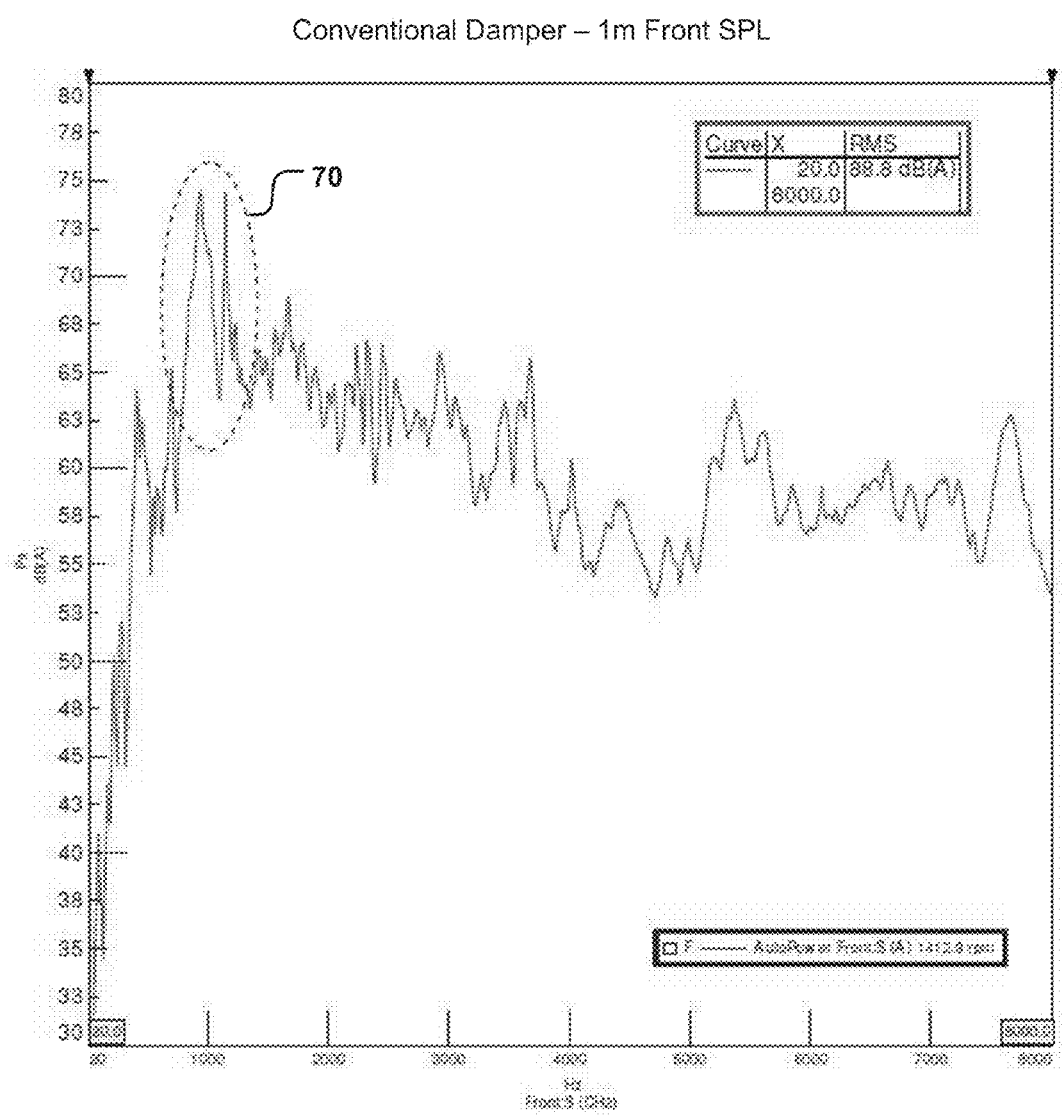
FIG. 5 is a graph showing 1 m front sound pressure level (SPL) measurement of a conventional crankshaft damper and tone wheel assembly.

In a comparison study, sound pressure level (SPL) measurements were conducted as per SAE 1074 standard (engine left, front, right and top side) for various tone wheel configurations. Using a conventional ("stock") tone wheel, such as shown in FIGS. 1A and 1B, in which the surface area of the tone wheel covers a substantial portion of an area surrounded by the ring-shaped inertial mass portion. The result of the SPL measurement for the conventional tone wheel is shown in FIG. 5. As can be seen at item 70, two significant peaks close to 930 Hz and 1150 Hz were observed in the 1 m SPL. At the 1 m front microphone, overall SPL was significantly dominated by these frequencies. The 1 m front SPL measurement shown in FIG. 5 was carried out at 100 ft-lb@1400 rpm.

Figure 6:
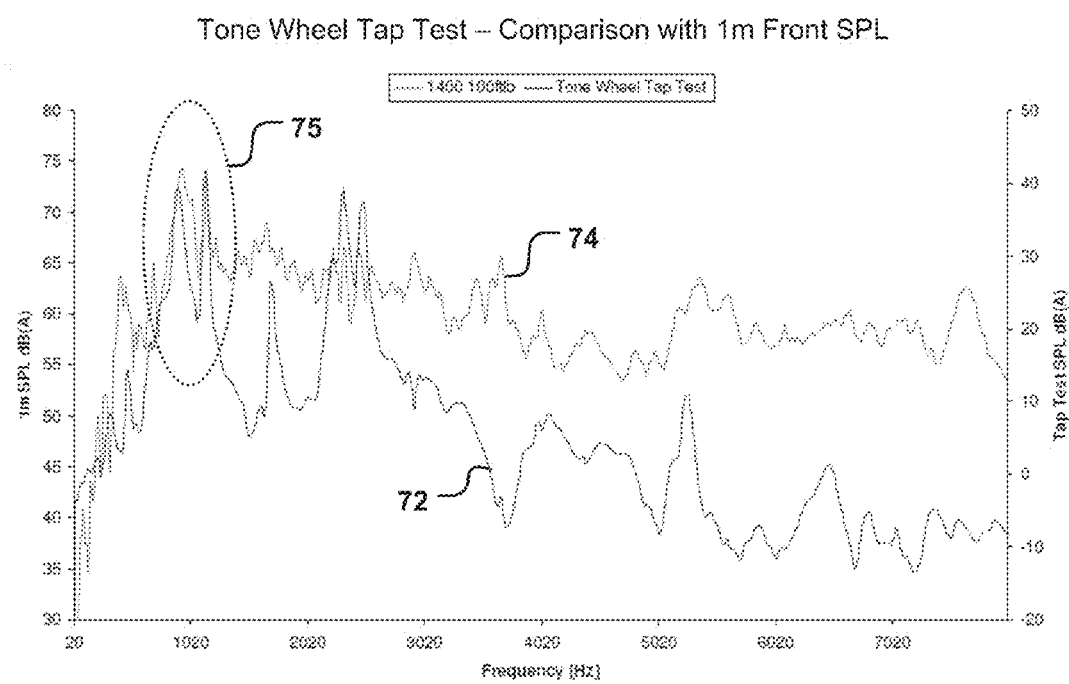
FIG. 6 is a graph showing a comparison of a tone wheel tap test and the conventional crankshaft damper and tone wheel assembly and the results of the 1 m front SPL of the conventional assembly.

FIG. 6 is a comparison of a tone wheel tap test of the conventional crankshaft damper/tone wheel assembly and the results of the 1 m front SPL at 100 ft-lb@1400 rpm. The tap test corresponds to curve 72 and the 1 m front SPL corresponds to curve 74. As can be seen from identifier 75 in FIG. 6, the natural frequency of the tone wheel matches very well with the peaks seen in the 1 m SPL spectrum (i.e., approximately 930 Hz and 1150 Hz).

Figure 7:
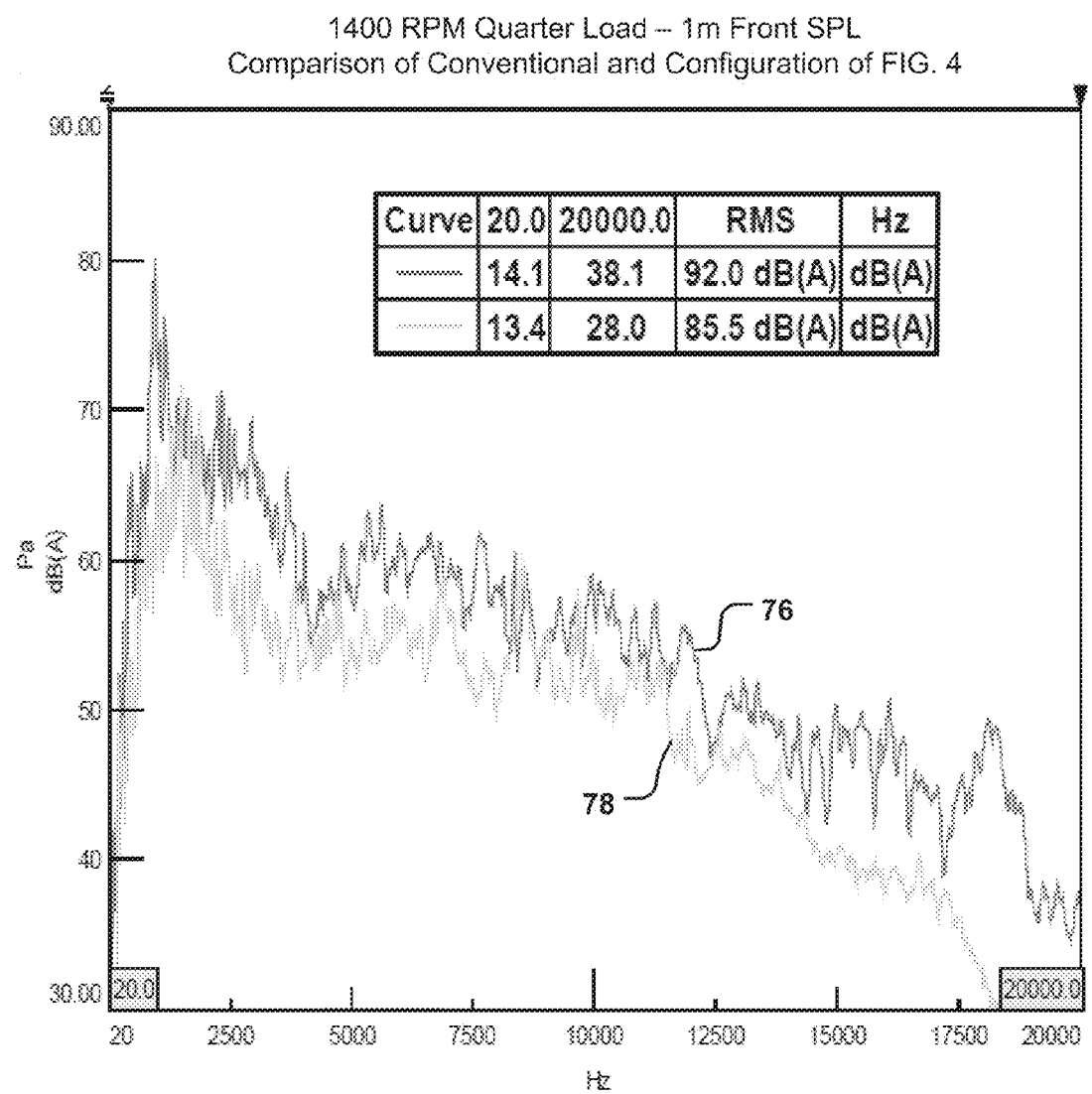
FIG. 7 is a graph showing 1 m Front SPL noise comparison results at 1400 RPM, quarter load of the conventional crankshaft damper and tone wheel assembly and an crankshaft damper and tone wheel assembly embodiment corresponding to the embodiment depicted in FIG. 4.

In FIG. 7, a noise comparison was performed at 1400 rpm quarter load—1 m front SPL between the conventional tone wheel having a surface area of the tone wheel covering a substantial portion of the area surrounded by the damper ring-shaped inertial mass portion as shown by curve 76, and a damper/tone wheel assembly according to the embodiment depicted in FIG. 4 as shown by curve 78. This comparison reveals that the two significant peaks around 950 Hz were significantly reduced. Additionally, the RMS SPL of the 1 m front microphone was reduced by 6.5 dB with the FIG. 4 crankshaft damper/tone wheel assembly embodiment compared with the conventional damper/tone wheel assembly. Significant noise benefits of more than 3 dB are expected across all other engine speeds and load conditions.

Figure 8:
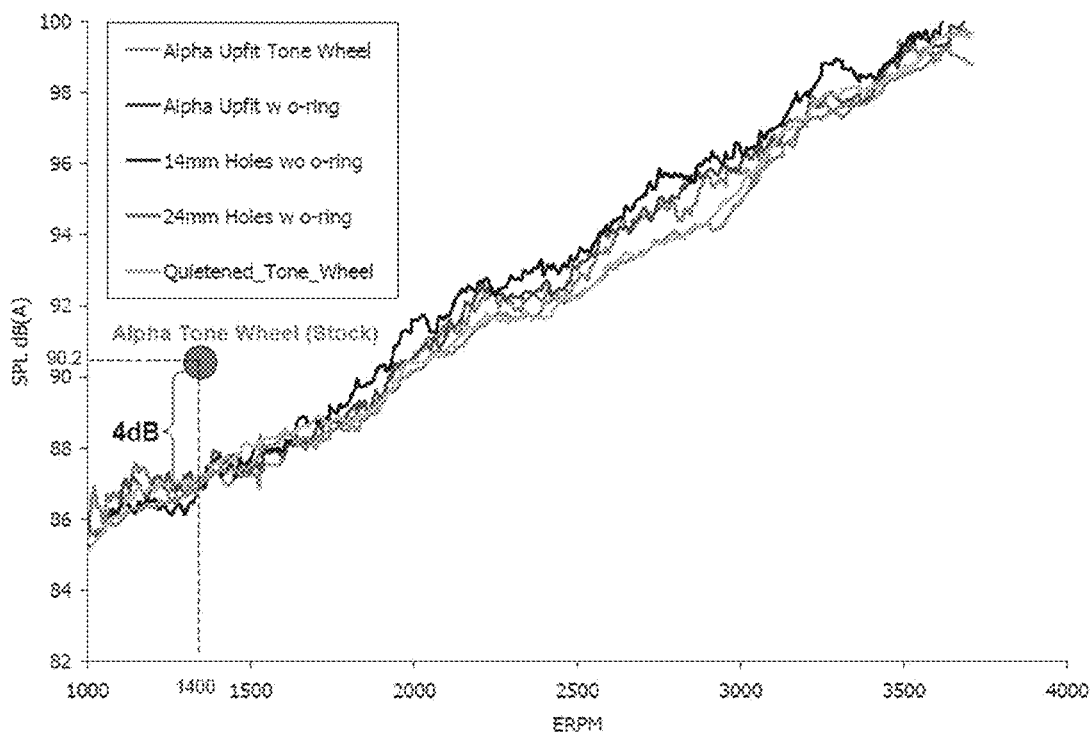
FIG. 8 is a graph showing full load comparison of exemplary crankshaft damper and tone wheel assembly embodiments in a short belt 1 m front SPL test across 1500-3700 RPM.

FIG. 8 shows a full load comparison in a short belt 1 m front SPL test across 1500-3700 RPM using various embodiments described above, where "Alpha Uplift Tone Wheel" corresponds to a FIGS. 2A and 2B exemplary embodiment, "Alpha Uplift w o-ring" corresponds to a FIG. 3 exemplary embodiment, "14 mm Holes w o-ring" and "24 mm Holes w o-ring" corresponds to a FIG. 4 exemplary embodiment, and the "Quietend_Tone_Wheel" corresponds to an exemplary embodiment with the surface area of the tone wheel not covering a substantial portion of the area surrounded by the damper ring-shaped inertial mass portion and using damping material between facing sides of the tone wheel and damper inertial mass. As can be seen, significant noise reductions are achieved with all embodiments when compared to the conventional crankshaft damper/tone wheel assembly of FIGS. 1A and 1B at 1400 PRM, which is depicted as "Alpha Tone Wheel (Stock)."

Figure 9:
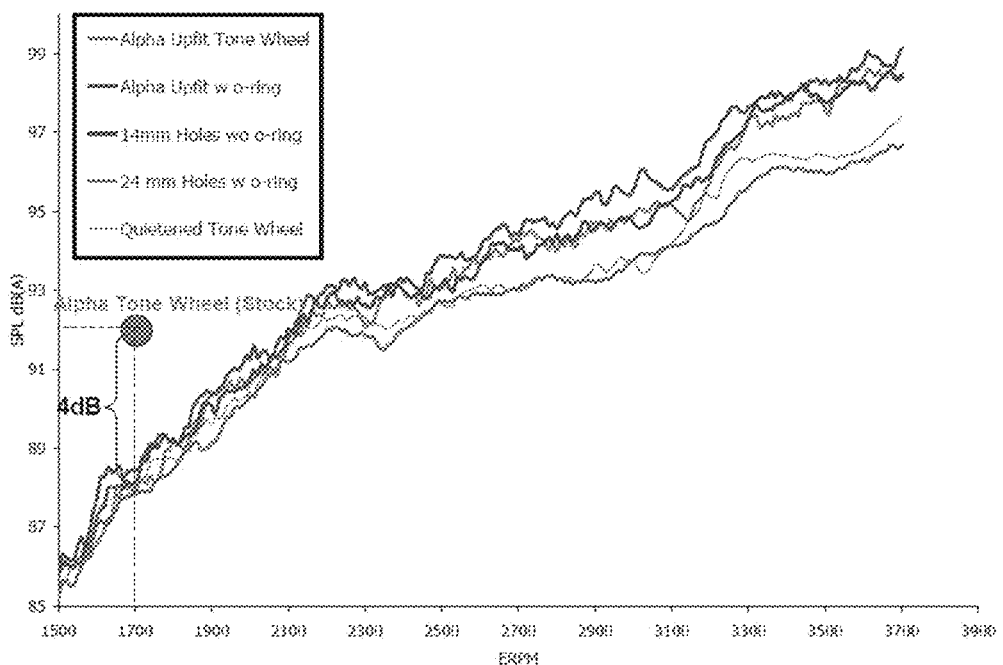
FIG. 9 is a graph showing a no-load comparison of exemplary crankshaft damper and tone wheel assembly embodiments in a short belt 1 m front SPL test across 1500-3700 RPM.

FIG. 9 shows a similar comparison for a no load condition. As can be seen, a substantial reduction in 1 m front SPL is achieved for all embodiments at 1700 RPM compared with the conventional crankshaft damper/tone wheel assembly of FIGS. 1A and 1B. FIGS. 8 and 9 also show that for full load and no-load operating conditions, the "24 mm Holes w o-ring" tone wheel embodiment consistent with the embodiment depicted in FIG. 4 provides exceptional reduction of radiated noise. It provides an overall of 0.7 dB(A) of average noise reduction across engine speeds at no load sweep conditions (an average of '3' runs reported for comparisons). Also, FIG. 7 shows that a significant 6 dB noise reduction at 1400 RPM quarter load condition was obtained by going from conventional (alpha stock) crankshaft damper/tone wheel assembly to a design consistent with the embodiment shown in FIG. 4 (i.e., the tone wheel having 24 mm holes with an elastic coupling such as an o-ring).

Although a limited number of embodiments is described herein, one of ordinary skill in the art will readily recognize that there could be variations to any of these embodiments and those variations would be within the scope of the appended claims. Thus, it will be apparent to those skilled in the art that various changes and modifications can be made to the crankshaft damper/tone wheel assembly described herein without departing from the scope of the appended claims and their equivalents.

What is claimed is:

1. A crankshaft damper and tone wheel assembly for damping vibrations of a crankshaft of an internal combustion engine and indicating a rotational speed or position of the crankshaft, comprising:
   a crankshaft damper including a hub portion and a ring-shaped portion connected to the hub portion by plural spokes, said ring-shaped portion having an inner circumference surrounding an area including the hub portion and the plural spokes; and
   an annular-shaped tone wheel connected to the crankshaft damper and having an inner diameter, an outer diameter, plural teeth arranged at an equal pitch along the outer diameter, and a same rotational axis as the crankshaft damper wherein,
   when viewed along a direction of the rotational axis, the annular-shaped tone wheel does not overlap a substantial amount of the area, and
   the annular-shaped tone wheel includes at least two openings extending through the annular-shaped tone wheel and positioned radially between the inner diameter and the plural teeth arranged along the outer diameter, the at least two openings being free from structure and sized and positioned to reduce noise radiation.

2. The crankshaft damper and tone wheel assembly of claim 1, wherein the inner diameter of the annular-shaped tone wheel substantially coincides with the inner circumference of the ring-shaped portion.

3. The crankshaft damper and tone wheel assembly of claim 1, wherein the annular-shaped tone wheel comprises a unitary plate extending from the inner diameter to the outer diameter.

4. The crankshaft damper and tone wheel assembly of claim 3, wherein the unitary plate includes plural attaching configurations that attach the unitary plate to the crankshaft damper.

5. The crankshaft damper and tone wheel assembly of claim 1, wherein the ring-shaped portion is an inertial mass portion of the crankshaft damper.

6. The crankshaft damper and tone wheel assembly of claim 1, wherein the annular-shaped tone wheel further comprises:
   an inner plate portion concentrically arranged with a unitary annular-shaped plate and including an attaching configuration for securing the inner plate portion to the crankshaft damper; and
   an elastic coupling element connecting the inner plate portion to the unitary annular-shaped plate.

7. An internal combustion engine, comprising:
   a crankshaft connected to a plurality of piston rods and pistons, said crankshaft having a rotational axis;
   a crankshaft damper and tone wheel assembly connected to an end of the crankshaft, said crankshaft damper and tone wheel assembly comprising:
   a crankshaft damper having a same rotational axis as the crankshaft and including a hub portion and a ring-shaped portion connected to the hub portion by plural spokes, said ring-shaped portion having an inner circumference surrounding an area including the hub portion and the plural spokes; and
   an annular-shaped tone wheel connected to the crankshaft damper and having an inner diameter, an outer diameter, and plural teeth arranged at an equal pitch along the outer diameter, wherein,
   when viewed along a direction of the rotational axis, the annular-shaped tone wheel does not overlap a substantial amount of the area, and
   the annular-shaped tone wheel includes at least two openings extending through the annular-shaped tone wheel and positioned radially between the inner diameter and the plural teeth arranged along the outer diameter, the at least two openings being free from structure and sized and positioned to reduce noise radiation.

8. The internal combustion engine of claim 7, wherein the inner diameter of the annular-shaped tone wheel substantially coincides with the inner circumference of the ring-shaped portion.

9. The internal combustion engine of claim 7, wherein the annular-shaped tone wheel comprises a unitary plate extending from the inner diameter to the outer diameter.

10. The internal combustion engine of claim 9, wherein the unitary plate includes plural attaching configurations that attach the unitary plate to the crankshaft damper.

11. The internal combustion engine of claim 7, wherein the ring-shaped portion is an inertial mass portion of the crankshaft damper.

12. The internal combustion engine of claim 7, wherein the annular-shaped tone wheel further comprises:
   an inner plate portion concentrically arranged with a unitary annular-shaped plate and including an attaching configuration for securing the inner plate portion to the crankshaft damper; and
   an elastic coupling element connecting the inner plate portion to the unitary annular-shaped plate.

* * * * *